United States Patent
Dorenbosch et al.

[11] Patent Number: 6,108,544
[45] Date of Patent: Aug. 22, 2000

[54] METHOD AND APPARATUS FOR PARTIAL COVERAGE ZONE SELECTIVE CALL COMMUNICATION

[75] Inventors: Jheroen Pieter Dorenbosch, Paradise, Tex.; Leonard Edward Nelson, Boynton Beach; Douglas Irvin Ayerst, Delray Beach, both of Fla.

[73] Assignee: Motorola, Inc., Schaumburg, Ill.

[21] Appl. No.: 08/865,485

[22] Filed: May 29, 1997

[51] Int. Cl.$^7$ ........................................... H04B 7/00
[52] U.S. Cl. ................... 455/435; 455/38.1; 340/825.44
[58] Field of Search .................................. 455/422, 434, 455/435, 436, 443, 444, 445, 454, 426, 31.1, 31.2, 31.3, 32.1, 38.1, 38.2, 38.4–38.5, 507, 515, 517, 524–525, 550, 552, 553, 566, 575; 340/825.44, 311.1

[56] References Cited

U.S. PATENT DOCUMENTS

| | | |
|---|---|---|
| 5,423,063 | 6/1995 | Goldberg . |
| 5,574,771 | 11/1996 | Driessen et al. ............... 455/31.3 |
| 5,710,972 | 1/1998 | Lin ............................................ 455/435 |
| 5,751,693 | 5/1998 | Dinkins .................................. 455/38.1 |
| 5,752,163 | 5/1998 | Robinson ........................... 340/825.44 |

*Primary Examiner*—Doris H. To
*Attorney, Agent, or Firm*—Pablo Meles; Charles W. Bethards

[57] ABSTRACT

A communication system (10) has a plurality of selective call transceivers (30) which operate as one-way selective call receivers in one-way coverage zones (16) where no registration is required or operate as selective call transceivers in two-way coverage zones (36) where registration is required or operate in one-and-a-half way zones where registration is attempted but not required for the selective call transceiver to receive outbound messages. The system further comprises a plurality of outbound transmitters (17, 18, and 19) covering one-way coverage zones (12, 14, and 16 respectively) and a plurality of base receivers (37, 38, and 39) and transmitters (11, 13, and 15) covering two-way coverage zones (32, 34, and 36 respectively). The one-and-half-way zone is primarily a mode of operation useful in areas having "spotty" inbound coverage and is not necessarily designated by a geographic location.

17 Claims, 5 Drawing Sheets

METHOD AND APPARATUS FOR PARTIAL COVERAGE ZONE SELECTIVE CALL COMMUNICATION

FIELD OF THE INVENTION

This invention relates in general to a two-way communication system and more specifically to a two-way communication device that can operate in multiple zones.

BACKGROUND OF THE INVENTION

The advent of two-way messaging presents a wide variety of new problems. To understand some of the problems, knowledge of two-way paging or messaging from a system level would be useful. In particular, a two-way paging or messaging system typically has an infrastructure system including a plurality of outbound transmitters coupled to a controller for encoding, batching and scheduling the transmission of messages to be sent over the air to a plurality of portable two-way subscriber units. The subscriber units, not considered part of the infrastructure, transmit inbound messages that are received by at least one of a plurality of base receivers which are also coupled to the controller. Thus, the controller further provides the function of correlating outbound messages from the outbound transmitters with the inbound messages from the subscriber units.

Users of two-way messaging devices are typically users of paging systems that already provide nationwide service. Thus, these users expect the new generation of pagers to behave at least as well as the one they left behind. Two-way pagers, unfortunately only provide true two-way messaging services where there is good inbound coverage. Unfortunately, rapidly building out the inbound portion of a two-way messaging system is expensive. Another problem is that getting seamless coverage is an arduous task that requires careful measurement. It implies a time-consuming iterative process of finding optimal sites for additional receivers. In certain areas, two-way services are started using powerful transmitters at sites optimized for one-way paging by installation of a co-located receiver at each site. Unfortunately these receivers may not have the same range as the transmitters. Zones with such partial inbound coverage in the present invention will be referred to as one-and-a-half way zones or areas. They are often referred to as 'leopard' zones because of the spotted pattern on the inbound coverage maps. Two-way pagers are known to function unpredictably in leopard zones, if they function at all.

Yet another problem is the high initial cost and slow market penetration of two-way units. Early exploitation of expensive spectrum can be aided by initial introduction of one-way pagers on the two-way frequencies. As two-way paging becomes more widely accepted and better supported by a range of applications, most one-way users will migrate to two-way devices. However, there is no way to move the remaining one-way pagers from the valuable two-way channels and to move legacy users to a few dedicated frequencies.

It is desirable to have a two-way messaging device, pager, or subscriber unit be able to operate in an area where there are no base receivers or where coverage is only provided by a one-way outbound base transmitter (or otherwise known as a one-way zone.) It would also be desirable to have a two-way messaging device use its two-way function as much as possible in areas where there is spotty inbound coverage without significantly degrading the battery life and other functions of the two-way messaging device. With existing two-way paging systems, the two-way subscriber device does not simply disable it's two-way functionality when the device detects that it is in a one-way zone. In fact, current two-way devices will not receive any messages until the system knows where the device is located since it cannot register in a one-way zone. Currently, the two-way device might display a prompt directing the user to call the service provider to notify the system of their current location. This "phone-in" registration is undesirable and creates an unnecessary burden on the user. Thus, a need exists for a communication system that allows a selective call transceiver for operation in a two-way coverage zone to seamlessly operate as a one-way selective call receiver in a one-way coverage zone or in other types of coverage zones or areas.

SUMMARY OF THE INVENTION

In a first aspect of the present invention, a method of operating a selective call transceiver in multiple coverage zones within a messaging system that could operate in a two-way area, a one-way area, or a one-and-a-half way area comprises the steps at the selective call transceiver of requiring registration, enabling the request of transmission of acknowledgments of receipt of outbound messages, and receipt of acknowledgments from the messaging system of inbound messages from the selective call transceiver when the selective call transceiver is within a two-way area. Additionally, the selective call transceiver attempts registration while enabling receipt of acknowledgments from the messaging system of inbound messages from the selective call transceiver without requiring the transmission of acknowledgments of receipt of outbound messages when the selective call transceiver is within a one-and-a-half way area.

In another aspect of the present invention, a selective call transceiver that operates in multiple coverage zones within a messaging system having a two-way area, a one-way area, and a one-and-a-half way area comprises a selective call receiver coupled to a decoder and a controller, a selective call transmitter coupled to the controller and an encoder and a memory coupled to the controller. Preferably, the controller is programmed in a two-way area to require the selective call transmitter to transmit registrations and transmit acknowledgments of receipt of outbound messages when required and further programmed in a two-way area to receive acknowledgments from the messaging system of inbound messages from the selective call transceiver and otherwise programmed to attempt registration while requiring receipt of acknowledgments from the messaging system of inbound messages from the selective call transceiver without requiring the transmission of acknowledgments of receipt of outbound messages when the selective call transceiver is within a one-and-a-half way area.

In another aspect of the present invention, a system controller for operation in a messaging system having selective call transceivers that can operate in a two-way area, a one-way area, or a one-and-a-half way area comprises a memory and a processor programmed to operate in either a two-way mode, a one-way mode, or a one-and-a-half way mode based upon whether a particular transceiver is correspondingly in the two-way area, the one-way area or the one-and-a-half way area, wherein in a two-way mode the processor requires inbound registrations and inbound transmissions of acknowledgments of receipt of outbound messages by the particular selective call transceiver and further requires outbound transmissions of acknowledgments from the messaging system of inbound messages received from the particular selective call transceiver and wherein in a one-and-a-half way mode, the processor is programmed to allow attempts at registration by the particular selective call transceiver while requiring outbound transmissions of acknowledgments from the messaging system of inbound messages from the selective call transceiver without requiring the receipt of acknowledgments from the selective call transceiver.

In another aspect of the present invention, a method of seamlessly creating a one-and-a-half way or a two-way zone from an existing one-way zone in a messaging system having a plurality of selective call transceivers comprises the steps of installing a base receiver within the one-way zone and requiring acknowledgments of outbound messages in the one-way zone from the selective call transceivers that are expected to be within a vicinity near the base receiver being installed. Finally, the method transmits system acknowledgments to the plurality of selective call transceivers that acknowledged outbound messages in the one-way zone after installation of the base receiver.

DETAILED DESCRIPTION

Figure 1:
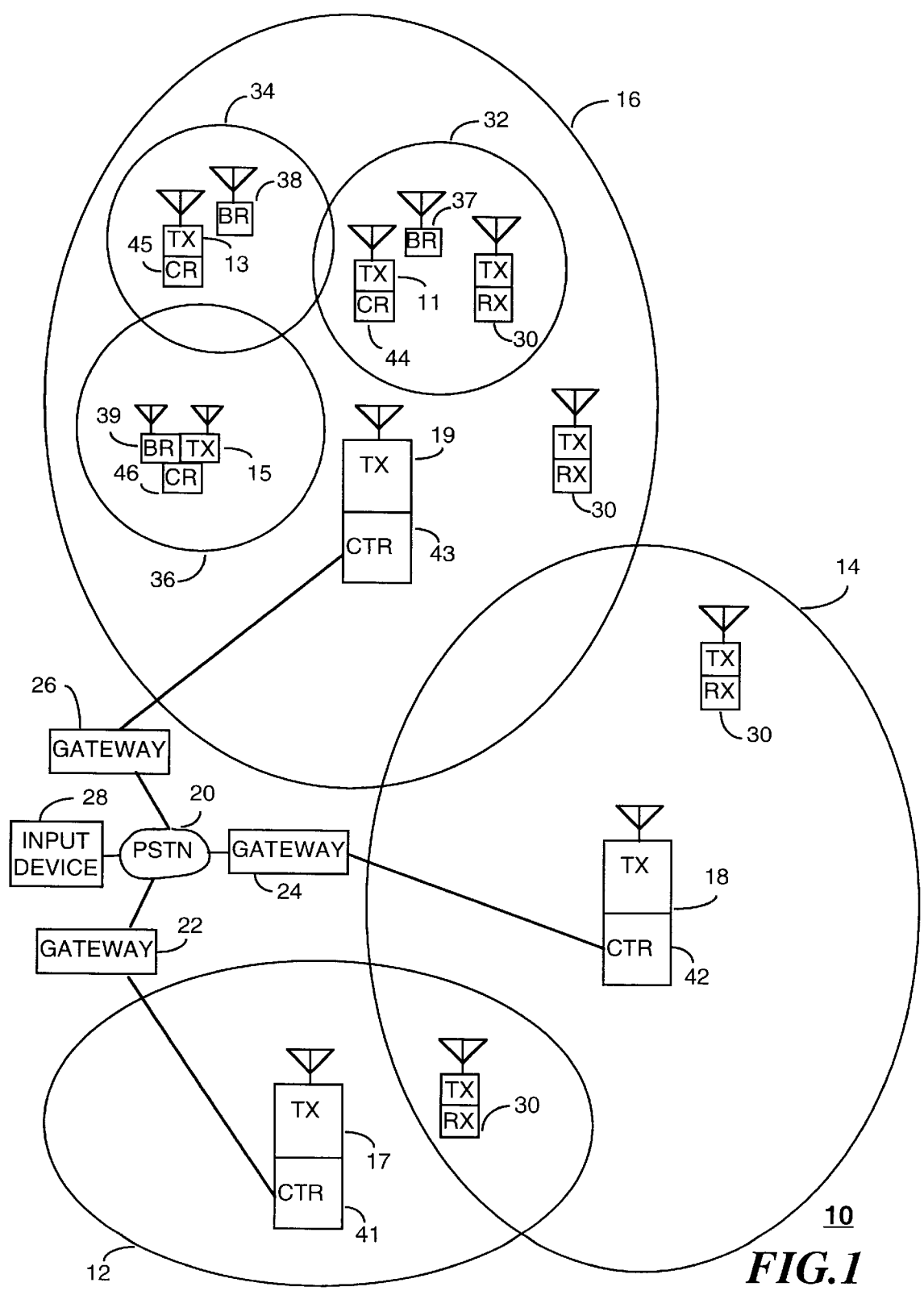
FIG. 1 is a block diagram of a communication system in accordance with the present invention.

Referring to FIG. 1, there is shown a communication system 10 having a plurality of selective call transceivers 30 which can operate as one-way selective call receivers in one of many one-way coverage zones (such as zones 12, 14 or 16) or as selective call transceivers in two-way coverage zones (such as zones 32, 34, or 36) or as selective call transceivers that operate in "partial coverage zones" or "one-and-a-half way" zones or areas in zones 32, 34, or 36. These areas may also be known as "Leopard" zones for their spotty inbound coverage. The communication system 10 preferably comprises a plurality of outbound transmitters 17, 18, and 19 covering the one-way coverage zones 12, 14 or 16 and optionally a plurality of outbound transmitters 11, 13, and 15 covering the two-way coverage or partial coverage zones 32, 34, and 36 respectively. The communication system 10 further comprises a plurality of base receivers 37, 38, and 39 also covering the two-way coverage zones for inbound transmissions from subscriber units such as the selective call transceivers 30. In one embodiment of the present invention, at least one of the plurality of selective call transceivers 30 has a preferred one-way zone list and is capable of detecting the one-way coverage zones and disabling the two-way function of the two-way selective call transceiver as the transceiver travels into a one-way coverage zone. The subscriber units can use various methods to distinguish transmissions from the plurality of outbound transmitters designated for the two-way coverage zones from transmissions from outbound transmitters for one-way coverage zones or from the partial coverage zones. Preferably the subscriber unit will determine the type of zone from system configuration information embedded in the transmissions sent by the outbound transmitters designated for the two-way coverage zones or the partial coverage zones or the outbound transmitters covering the one-way coverage zones. Further, the selective call transceiver will preferably operate in an hierarchical fashion, registering and operating as a transceiver in a two-way zone even if the one-way zone overlaps the two-way zone as will be seen from the flow charts of FIGS. 2 and 3. Preferably the communication system 10 stores a preferred one-way zone list matching the preferred one-way zone list in the selective call transceiver in the infrastructure portion. Additionally, the communication system 10 can store a preferred one-an-a-half way zone list matching the list in the selective call transceiver. Alternatively, this list is stored in one of many paging controllers such as the controllers 41, 42, 43, 44, 45, or 46. It should be understood that although a one to one ratio of controllers to transmitters are shown in FIG. 1 for simplicity, a more typical configuration may have many transmitters to one controller and/or message gateway. Preferably, the list could be stored in one of many wireless message gateways 22, 24, or 26 that preferably couple to the controllers. Additionally, the communication system 10 preferably includes an input device 28 such as a telephone, computer, or alpha entry device that couples to the phone network 20 and subsequently to the wireless message gateways.

Figure 2:
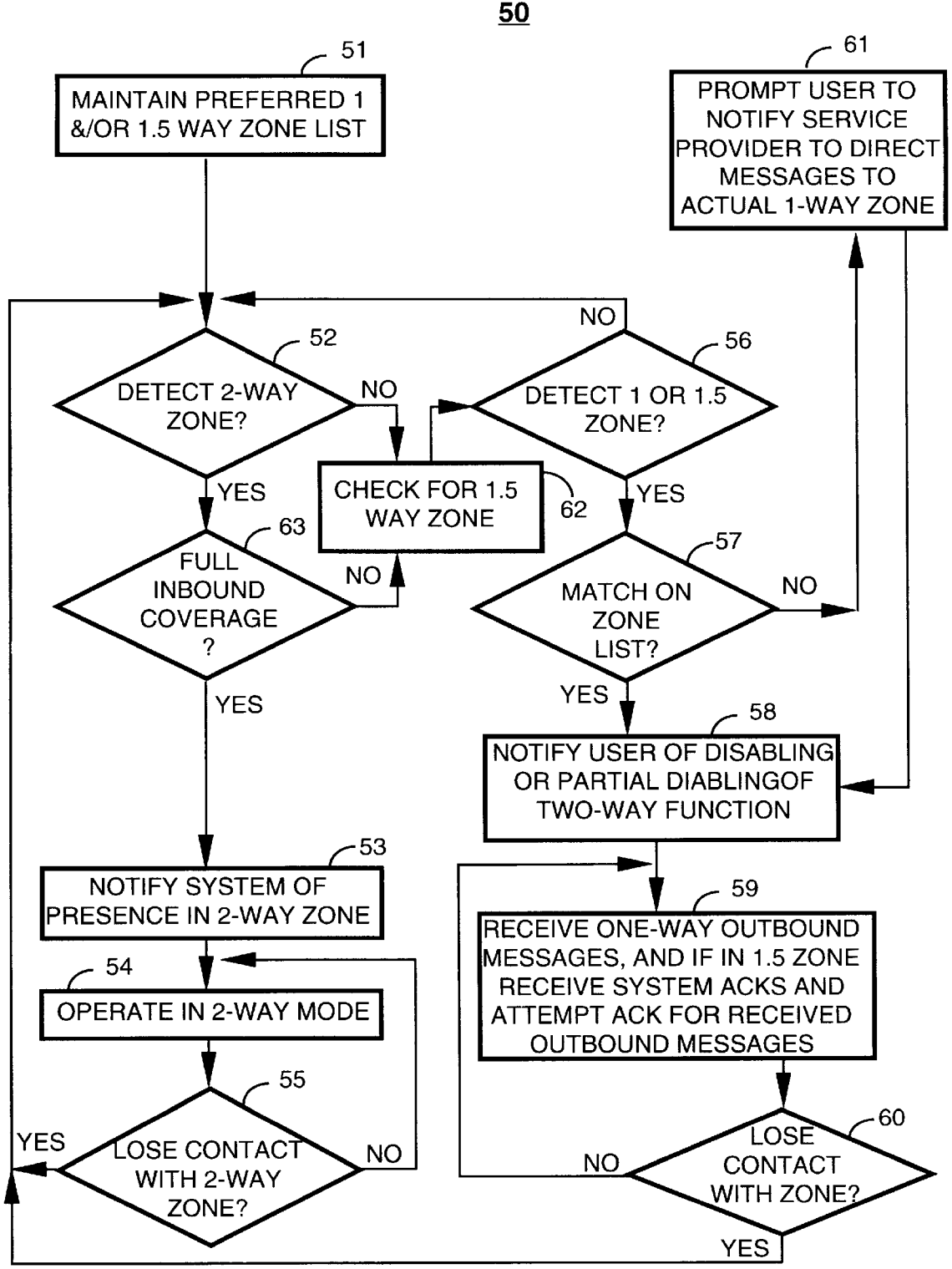
FIG. 2 is a flow chart of a selective call transceiver method in accordance with the present invention.

Referring to FIG. 2, a flow chart of a method 50 for making a selective call transceiver operational as a one-way receiver in a one-way selective call receiver coverage zone or as a selective call transceiver in a partial coverage zone is shown. At block 51, the method preferably comprises the step at the selective call transceiver of maintaining a preferred one-way and/or a one-and-a half way zone list. Additionally, a preferred two-way zone list may be maintained as well. At decision block 52, the selective call transceiver attempts to detect a two-way zone. If the selective call transceiver detects a two-way zone, then the transceiver determines if it has full inbound coverage at block 63, typically by waiting for an acknowledgment of a previous inbound transmission by an outbound system transmitter. If the acknowledgment fails, then the selective call transceiver checks for one-and-half way coverage at block 62. If a zone is detected at decision block 56 and if the zone can operate as a one-and-a-half way zone that matches a zone on the list at decision block 57, then the user can be notified of the partial disabling of the two-way function at step 58 and the selective call transceiver can operate in the one-and-a-half way mode at step 59.

If it appears that the transceiver has full inbound coverage at decision block 63, then the transceiver notifies the system of its presence in the two-way zone at block 53 and the transceiver continues to operate in a two-way mode at step 54. At decision block 55, if contact is lost with the two-way zone, the transceiver again attempts to detect a two-way zone and otherwise continues to operate in a two-way mode.

If no two-way zone is detected at decision block 52, then the selective call transceiver attempts to detect a one-way or a one-and-a-half way zone at block 62 and/or decision block 56. If such zones are not detected, then the transceiver will return to scan for two-way zones. If a one-and-half way zone is detected, then the method will operate as previously described above. If a one-way zone is detected, then at decision block 57, the transceiver determines if the one-way zone detected matches a zone on the preferred one-way zone list. If a match is found at decision block 57, then the transceiver notifies the user that the two-way function will be disabled at block 58. In other words, the transmitter portion of the transceiver will be disabled or substantially disabled and the transceiver will only receive one-way outbound messages as shown in block 59. If contact is lost with the one-way zone at decision block 60, then the transceiver again preferably returns to scanning for two-way zones. Returning to decision block 57, if the one-way zone or the one-and-half way zone that was detected does not match a zone on the preferred one-way (or one-and-a-half way) zone list, then the selective call transceiver can prompt the user to notify their service provider (typically by calling into a paging terminal) to direct messages to the actual one-way zone by describing their location as shown in block 61. The notification to the user preferably takes the form of a alphanumeric message on a liquid crystal display, although other forms of notice can be given, such as a voice prompt by a voice pager such as Motorola's Tenor™ subscriber unit.

Figure 3:
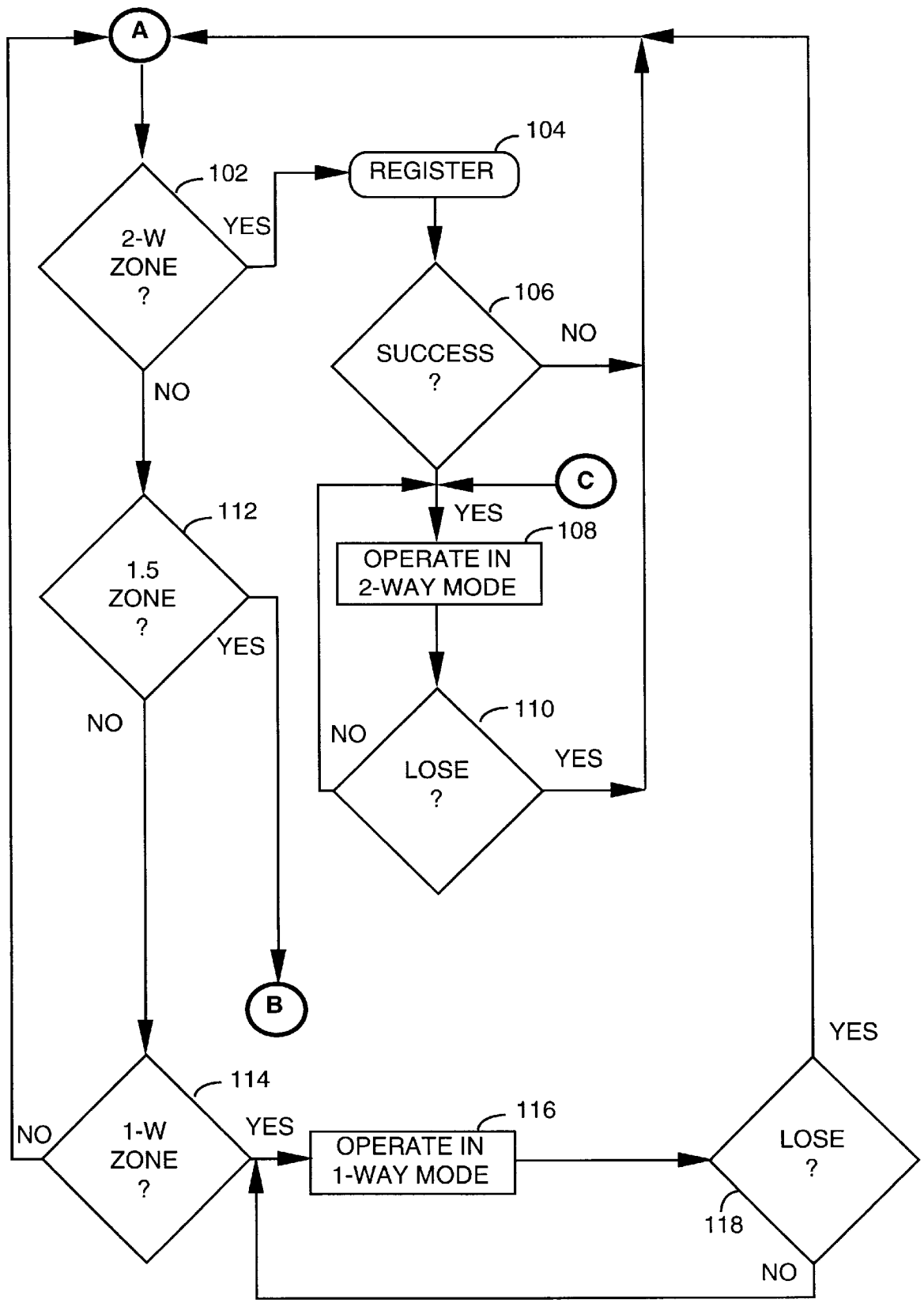
FIG. 3 is another flow chart of a selective call transceiver in accordance with the present invention.
Figure 4:
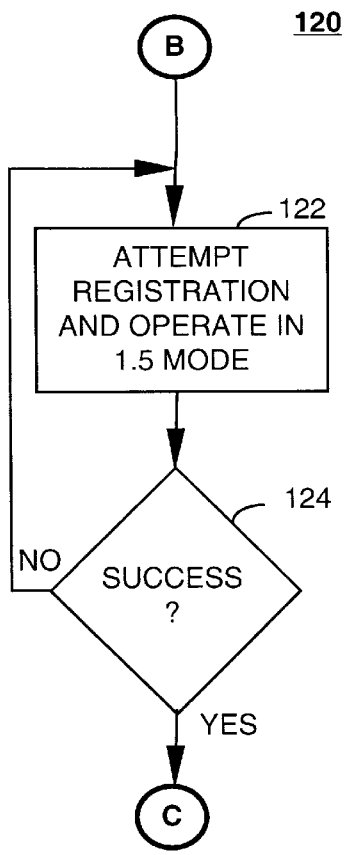
FIG. 4 is a continuation of the flow chart of FIG. 3 in accordance with the present invention.
Figure 5:
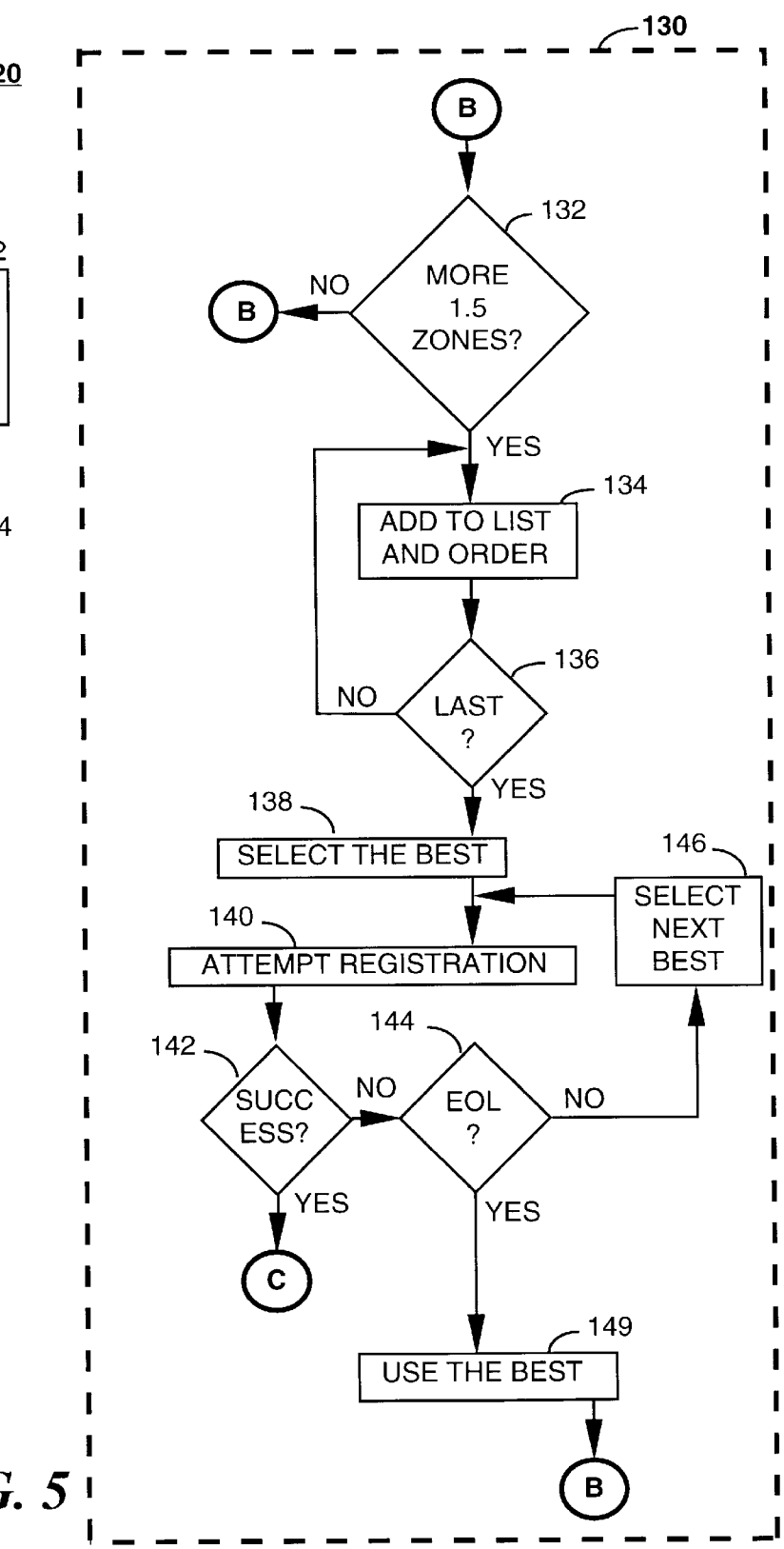
FIG. 5 is an alternative continuation of the flow chart of FIG. 3 in accordance with the present invention.

Referring to FIGS. 3, 4, and 5, another embodiment of the present invention having a cleaner hierarchical method is illustrated. The method 50 of operating a selective call transceiver in multiple coverage zones initially begins with the selective call transceiver scanning for the highest grade of service. Thus, the transceiver scans for two-way zones at decision block 102. If a two-way zone is found, the method requires the transmission of a registration request by the transceiver at step 104. If the registration request is received and the request is granted by the messaging system, the messaging system will transmit a registration grant response to the transceiver. If the registration grant response is received by the transceiver, then registration is deemed successful at decision block 106. In any event, if registration is successful at decision block 106, then the transceiver operates in the two-way mode at step 108 until the two-way zone is lost as indicated by decision block 110. In the two-way mode of operation, the transceiver is enabled to receive and acknowledge outbound messages as well as enabled to generate inbound messages and receive acknowledgements for inbound messages. If the two-way zone is lost, then the method 100 returns to "A" and continues to scan for two-way zones as before.

If no two-way zone is found at decision block 102 and no one-and-half way zone is found at decision block 112, then an inquiry is made by the transceiver at decision block 114 whether it is within a recognizable one-way zone. If no recognizable zone is found at block 114, then the method returns to "A" and begins to scan for two-way zones again. If a recognizable one-way zone is found at block 114, then the transceiver preferably disables the transmissions of inbound messages and operates in a one-way mode at step 116. If the one-way zone is lost, then the method returns to "A" and begins to scan for two-way zones.

Referring to FIGS. 3 and 4, if a one-and-a-half way zone is found at decision block 112, then the transceiver progresses to "B" of the method "subroutine" or portion 120 by attempting registration and operating in a one-and-a-half way mode at step 122. If registration is successful at decision block 124, then the transceiver would then preferably operate in a two way mode by returning to "C" of FIG. 3. Thus, while the transceiver remains in a one-and-a-half way mode, it may attempt registrations by sending registration requests to the messaging system while enabling receipt of outbound messages. The transceiver in the one-and-a-half way mode would further inhibit the transmission of inbound messages (except for registration requests) until registration is successful.

Referring to FIGS. 3, 4 and 5, if a one-and-a-half way zone is found at decision block 112, then the transceiver can progress to an alternative method "subroutine" or portion 130 by first determining if there are other one-and-half zones "seen" by the selective call transceiver. If no other one-and-half zones are seen, then the method returns to "B" of FIG. 4. If more zones are found at block 132, then a list is created and ordered at step 134. The ordering can be done by a myriad of criteria including signal strength or signal quality ratings to name a few. If the list is completed at block 136, then the best one-and-a-half zone is selected at step 138 (as ordered from step 134) and registration is attempted with such zone at step 140. The transceiver will also preferably operate in a one-and-a-half way mode at step 140. If registration is successful at block 142, then the transceiver operates in a two-way mode and returns to "C" of FIG. 3. If registration is not successful at decision block 142, then the next best zone (from the ordered list obtained at step 134) is used to attempt registration. If the list is exhausted at decision block 144, then the zone that had the best registration attempt is used at step 149 to attempt registration at step 122 of FIG. 4. The best registration attempt is preferably understood to mean the zone that is listed first or the zone having the highest rank in the ordered list. Then, the alternative method continues to operate as previously described with reference to FIG. 4.

Preferably, the present invention displays a set of tokens on the outbound channels that together define the type of area and rules that govern the functioning of different types of selective call transceivers, receivers or pagers. Preferably the tokens take the form of a one-way or two-way Area Type indicator. An Area Type indicator is used to show whether an area is a one-way or a two-way area. In accordance with the present invention, two-way devices such as pagers can initiate inbound transactions in a two-way area. Two-way pagers must notify the system when they enter a two-way zone. These notifications, also called registrations, have a dual function: they authenticate a pager with the system and they enable automated frequency reuse. Registrations allow for the targeting of messages to a particular zone in which the pager is registered, thus obviating the need to broadcast messages to all zones and significantly saving overall system capacity. In a one-way area, pagers preferably are not allowed to initiate transactions. 2-way messaging could be possible without authentication and reuse by passing location information to the system using a telephone or another non-paging device. The table below, illustrates the over-the-air system definition tokens that could be used in accordance with the present invention:

OTA System Definition Tokens

| Area Type | Inbound Coverage | Access Control |
|---|---|---|
| One-way/ Two-way | Full Partial | One-way OK Two-way OK |

Preferably, two-way pagers (or selective call transceivers) in a one-way zone generate inbound responses when instructed by the system. This allows for the possible temporary installation of one or more receivers at critical locations or events, such as conferences or sporting events. Presence of two-way pagers at these locations can then be confirmed, messages can be reliably delivered and pagers can be queried for results without any effect on the operation of pagers in the remainder of the one-way area.

In accordance with the present invention, a selective call transceiver can be programmed to perform system selection scanning using the System Definition Tokens to select the highest grade service available in a certain area. When presented at a single location with a choice of different grade services offered by its service providers, a selective call transceiver will automatically select the service with the highest grade: two-way service, over one-and-a-half-way service, over one-way service.

With regard to one-and-a-half way zones, the present invention defines a novel type of service that strikes a balance between one-way and two-way operation. This one-and-a-half-way mode is optimized for areas with partial inbound coverage. The following rules may apply in such zones or areas:

1. If no higher grade service is available and a one-and-a-half-way service is found, the transceiver must initiate notifications (registration requests) until a response (registration grant) is received from the system. A back-off mechanism is used to space notification attempts in time to obtain good battery life.
2. Authentication (registration) is not required to receive messages in one-and-a-half-way areas. Messages can always be received.
3. Inbound transactions can only be initiated after successful authentication, since it indicates that transmissions of the transceiver can actually be received by the system.
4. If an inbound transaction fails, the transceiver must stop any other ongoing inbound transactions and again try to notify the system. This rule saves battery life when a transceiver attempts multiple, simultaneous inbound transactions. This often happens when a user takes the time to read and reply to several messages. Instead of continuing to attempt the individual transactions when one of them fails, the transceiver sends only a single sequence of notification attempts at a well-defined, reasonable rate.

With respect to one-way zones, the one-way subscriber device (selective call receiver) should function the same in all three types of areas: they do not initiate inbound transmissions, they do not require authentication and can always receive messages. However, they can harmoniously operate in two-way systems and profit from much of the advanced functionality of the two-way protocols: flexible roaming, refined message control and enhanced message reliability. A two-way subscriber device (selective call transceiver) operating in a one-way zone may still have the additional option of attempting registration or attempting any kind of inbound transmission at the request of the messaging system despite its presence in a one-way zone.

The present invention can also provide enhanced delivery of one-way messages to one-way subscriber units using two-way fragmentation protocols without acknowledgments. A message is partitioned in many smaller fragments and each fragment is sent several times, spread out over an extended period of time. The one-way subscriber unit uses the two-way protocol rules for fragment recombination. Even without inbound acknowledgments, two features or properties of the present invention increase message reliability over brute-force retransmission of the complete messages. First, the property of time diversity lowers the effect of fades and temporary coverage loss and second, the chance of having an error in all of multiple copies of the any fragment is much smaller than the chance of hitting all copies of the message if the message was repeated in its entirety.

Preferably, the present invention makes use of a user interface that is easily implemented in a device with limited display space. A special icon can be used to inform the user of the type of area, so that an educated user can have corresponding expectations on the inbound capability. A simple icon can be used such as >(up arrow for 2-way), fl (down arrow for one-way), and fi (and side arrow for one-and-a-half-way).

The following two tables provide an overview of how a selective call transceiver or selective call receiver would operate in two-way, one-way or a one-and-a-half way zone:

TABLE 1

Overview of main two-way pager functionality

| two-way pager | Notification/ Registration | Authentication/ Acknowledge | Outbound messages | Inbound messages |
|---|---|---|---|---|
| two-way area | Mandatory. Pager will give up and look for better service | Required | Authentication is required | Authentication is required |
| one-and-a-half-way area | Mandatory. Pager does not give up | Attempted | Authentication not required | Authentication is required |
| one-way area | None | None | Authentication not required | None |

TABLE 2

Overview of main one-way pager functionality

| one-way pager | Notification | Authentication | Outbound messages | Inbound messages |
|---|---|---|---|---|
| two-way area | None | None | Any | None |
| one-and-a-half-way area | None | None | Any | None |
| one-way area | None | None | Any | None |

The System Definition Tokens described above further provide for access control. A single flag is preferably used by using the following rules:

1. A two-way pager is allowed in a two-way area by default.
2. A one-way pager is allowed in a one-way area by default.
3. A one-way pager is allowed in a two-way area, only when the Access Control Flag is set.
4. A two-way pager is allowed in a one-way area, only when the Access Control Flag is set.

The access control token can thus be used to allow one-way and two-way devices to function in a common system, or to move the devices to separate one-way and two-way systems.

The table below illustrates where one-way and two-way pagers can operated based on the Access Control flag setting:

TABLE 3

Access Control

| Access Control OFF | one-way pagers | two-way pagers | Access Control ON | one-way pagers | two-way pagers |
|---|---|---|---|---|---|
| one-way area | ✓ | ✓ | one-way area | ✓ | X |
| two-way area | ✓ | ✓ | two-way area | X | ✓ |

Messaging terminals or controllers must have a way to query the status and configuration details of one-way areas and one-and-a-half-way areas. Ideally, the present inventions allows a messaging terminal or controller to specify the mode in which a message is to be sent. Current network protocols only allow specification of one-way or two-way transmission. The present invention allows a new specification of a preferred delivery mode, such as two-way preferred or one-way preferred or a one-and-a-half way preferred mode. The controller responsible for the area would normally deliver as specified, but may use local rules to optimize local operation. Additionally, the controller can inform the requester of the mode actually used for the message.

A wireless message gateway 22, 24, or 26 as shown in FIG. 1 in accordance present invention would preferably maintain a preferred one-way zone list and a one-and-a-half way zone list matching a list in the two-way selective call transceiver. Unless the user directs messages to a one-way zone, the controller may first attempt to deliver a message or attempt to locate a transceiver in a two-way zone in which the unit was last registered. And, if no response (or acknowledgment) is received, the system would then try other preferred zones (one-way or one-and-a-half way). Ideally, the controller would seek the presence of a selective call transceiver in a two-way zone and continue two-way communication if the selective call transceiver is found in the two-way zone. The controller would also preferably send one-way outbound messages to the selective call transceiver in a one-way zone if a user directed messages to the one-way zone and send one-way outbound messages to the selective call transceiver to the zone or zones designated in the preferred one-way zone list if no two-way zone is detected and no one-way zone is directed by a user of the two-way selective call transceiver. Additionally, the controller could generate and/or update a preferred one-way zone list for the two-way selective call transceiver based upon the known zone configurations at the transceiver's location when the selective call transceiver enters and successfully registers in a two-way zone. Also, a preferred zone list can be updated with information received over-the-air after successful registration by the selective call transceiver.

Figure 6:
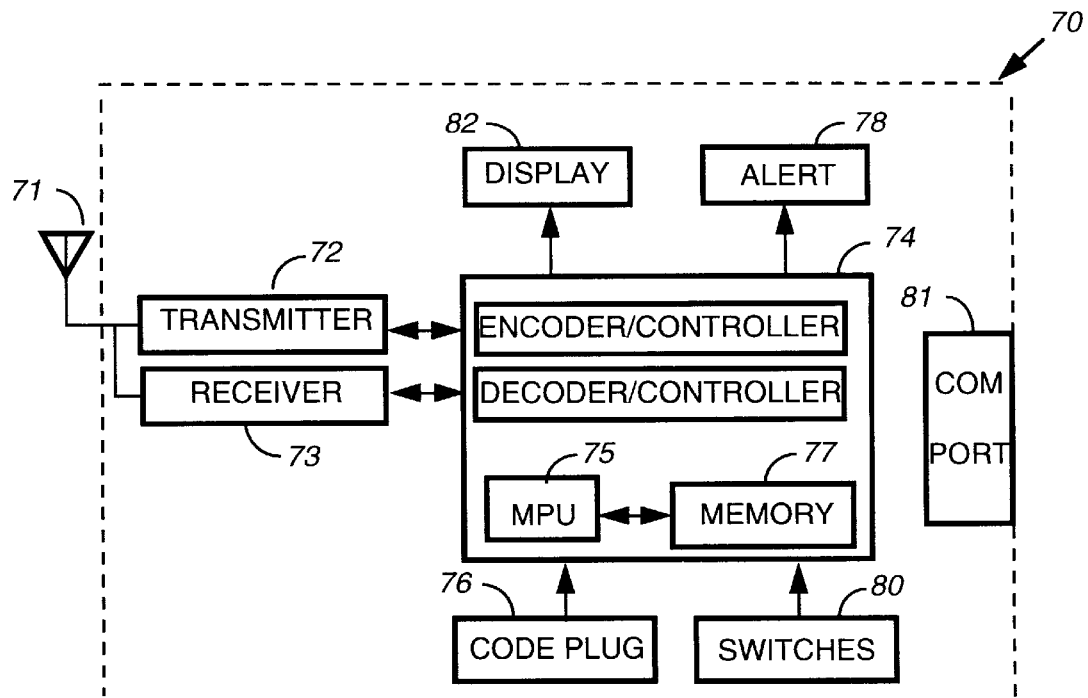
FIG. 6 is another block diagram of a selective call transceiver in accordance with the present invention.

Referring to FIG. 6, a selective call transceiver 70 which can operate as one-way selective call receiver in a one-way coverage zone or as selective call transceiver in a one-and-a-half coverage zone or two-way coverage zone is shown. Preferably the transceiver 70 comprises a selective call receiver 73 coupled to a decoder and a controller (74) and a selective call transmitter 72 coupled to the controller and an encoder (74). The transceiver 70 preferably further comprises a memory 77 coupled to the controller containing a list of preferred one-way zones and/or one-and-a-half way zones, wherein the selective call transceiver will operate as a selective call receiver if the selective call receiver fails to detect a two-way coverage zone and detects a matching preferred one-way zone. Alternatively, the preferred zone lists can reside in another memory location such as the code plug 76. The selective call transceiver can further comprise a means of notifying the user of the selective call transceiver that the two-way function of the selective call transceiver is disabled or partially disabled or in other words, that no inbound message transmissions will be sent. Such means of notifying can include either a display 82 such a liquid crystal display or a tactile or audible alert 78 such as a transducer (such as a speaker in a Motorola Tenor™ Voice Pager) or vibrator motor.

Referring to FIG. 1 again, the wireless message gateways 22–26 in the communication system 10 preferably comprise a plurality of preferred one-way (and/or one-and-a-half) zone lists corresponding to preferred one-way (and/or one-and-a-half) zone lists in the plurality of selective call transceivers which is periodically updated with the preferred zone list in the plurality of selective call transceivers. The controllers or system controllers (41–46) also each preferably comprise a processor for performing the functions of either detecting the presence of a selective call transceiver in a two-way zone and continuing two-way communication if the selective call transceiver is found in the two-way zone or sending one-way outbound messages to the selective call transceiver to a one-way zone if a user directed messages to the one-way zone or otherwise sending one-way outbound messages to the selective call transceiver to the zone or zones designated in the preferred one-way zone list if no indication of the subscriber's presence in the two-way zone is detected and no one-way zone is directed by a user of the selective call transceiver. The plurality of one-way zone lists at the controller can be updated by polling the statistically derived preferred one-way zone list at the two-way selective call transceiver and updating the preferred one-way zone list at the controller when the selective call transceiver registers with a two-way zone. Additionally, a list of nearby zones could be maintained of where the unit is likely to be located based upon keeping track of the unit's last known location.

Referring to FIG. 6, the portable two-way selective call communication device 70 may take the form of a selective call transceiver as shown. The device 70 includes an antenna 71 for intercepting transmitted RF signals and for transmitting RF signals via a transmitter 72. The antenna 71 couples a received signal to a receiver 73, the receiver 73 and the transmitter 72 forming a transceiver. The transceiver produces a data stream representative of a demodulated received signal coupled to a decoder/controller 74. The transceiver (72, 73) is also responsive to a modulation input such as data received from the decoder/controller 74 to frequency modulate a carrier signal for transmission out from the device 70. As is well known in the art, the decoder/controller 74 may include a central processing unit such as a microprocessor 75 or the like for processing demodulated signal information in accordance with the software stored in a memory 77 of the decoder/controller 74. The decoder/controller 74 is also responsive to inputs from one or more switches 80 or other input devices to generate data that is coupled to the transceiver (72, 73) for transmission out from the device 70. The RF signals transmitted by the transmitter units of a paging subsystem typically include control information containing an address that identifies a particular device 70 and any necessary zone identification and/or configuration information. The page message information follows the control information. The decoder/controller 74 decodes a received address by comparing it with one or more addresses stored in a code plug or code memory 76. If the decoder/controller 74 detects a match between a received address and a stored address, an alert signal may be generated by a device 78 so as to alert a user that a message has been received by the device 70. The alert signal may be an audible and/or tactile alert such as a silent vibrating alert. It is noted that if the RF signals only contain control information and no user viewable message, an alert need not be generated upon an address match. The switches 80 may be actuated by a user to select between the types of alerts as well as for inputting information to the memory 77 and causing a message stored in the memory of the decoder/controller 74 to be accessed for display on a display 82. The switches 80 may also provide additional functions such reset, read, delete, etc. as is well known. It will be apparent that the switches may form a keyboard. Alternative or additional input devices may also be included in or connected to the subscriber unit such as a touch panel, mouse, etc. The device 70 may also include a conventional communication port 81 for hardwire connection to a wired subsystem as well.

Figure 7:
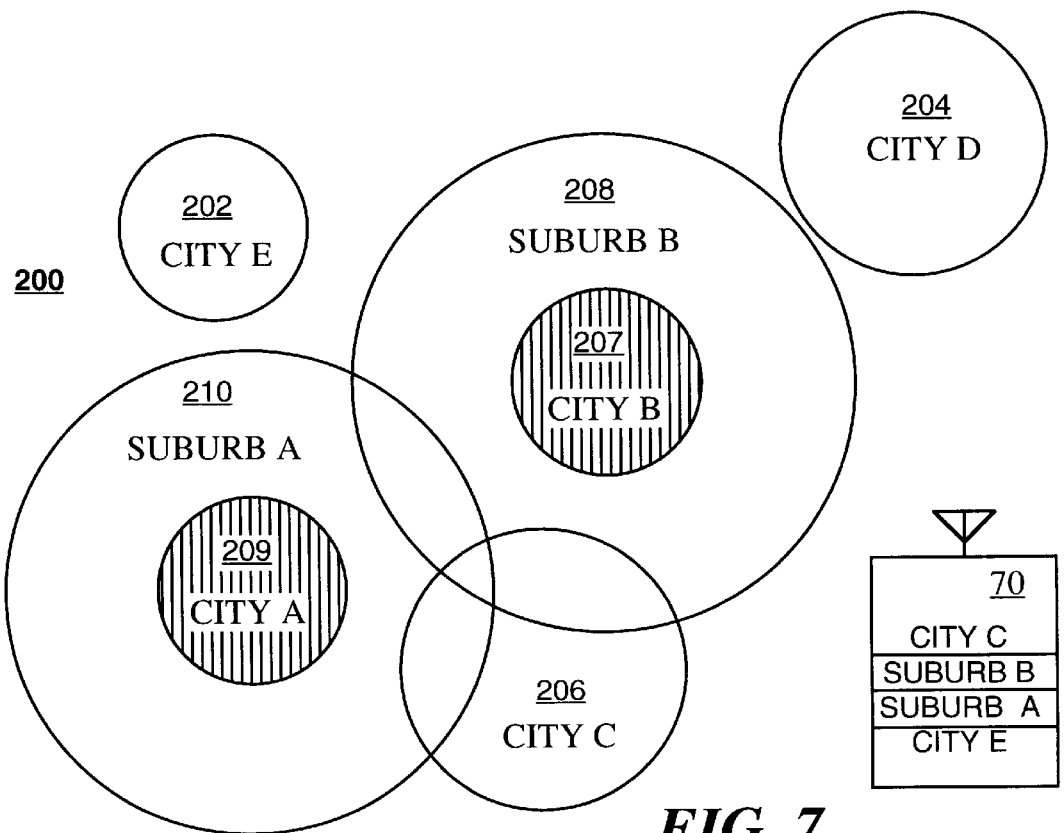
FIG. 7 is coverage pattern diagram of a communication system in accordance with the present invention.

Referring to FIG. 7, a communication system 200 is shown having a plurality of one-way zones (202, 204, 206, 208, and 210) and a plurality of two-way zones (207 and 209). The one-way zones 202, 204, 206, 208, and 210 can correspond to geographic areas represented as City E, City D, City C, Suburb B and Suburb A respectively while the two-way zones 207 and 209 can correspond to geographic areas represented as City B and City A respectively. A particular pager will have its own preferred one-way and/or one-and-a-half way zone list as shown with selective call transceiver 70. When a selective call transceiver cannot be found in any two-way zone, the system can send pages or messages to the zones in the preferred zone list which in the case of selective call transceiver would be City C, City E, Suburb A and Suburb B. Preferably, the selective call transceiver will then display a prompt indicating one-way or one-and-a-half way service only as appropriate (preferably>for 2-way; fl for one-way; and fi for one-and-a-half-way as previously explained.) If the selective call transceiver 70 moves to City D (which is not on the preferred zone list), then the selective call transceiver 70 will display a prompt to have the user call the service provider.

Thus, in summary, an ideal system in accordance with the present invention would require registration by a selective call transceiver in a two-way zone in order to permit receipt of messages and transmission of inbound messages. Meanwhile, in a one-and-a-half way zone, the selective call transceiver could receive outbound messages prior to registration but is restricted from transmitting inbound messages or commands (except for registration attempts) until the messaging system grants the selective call transceiver a registration grant and the selective call transceiver receives such grant.

It should be understood that the disclosed embodiments are merely examples and the invention is not restricted thereto. It will be understood by those skilled in the art that variations and modifications can be made within the scope and spirit of the present invention as defined by the appended claims.

What is claimed is:

1. A method of operating a selective call device in multiple coverage zones within a messaging system that provides for a two-way area, a one-way area, and a one-and-a-half way area, comprising the steps at the selective call device of:

requiring registration before enabling receipt of outbound messages and before enabling a transmission of inbound messages from the selective call device when the selective call device is within a two-way area; and attempting registration while enabling receipt of outbound messages, and inhibiting the transmission of inbound messages from the selective call device when the selective call device is within a one-and-a-half way area.

2. The method of claim 1, wherein the method further comprises the steps of disabling the transmission of registration requests while enabling the receipt of outbound messages, and inhibiting the transmission of inbound messages from the selective call device when the selective call device is in a one-way area unless the messaging system specifically requests the selective call device to transmit an inbound signal.

3. The method of claim 1, wherein the method further comprises the steps at the selective call device of receiving repeated copies of fragments of a message over an extended period of time without acknowledging receipt of each fragment.

4. A method of operating a selective call transceiver in multiple coverage zones within a messaging system that provides for a two-way area, a one-way area, and a one-and-a-half way area, comprising the steps at the selective call transceiver of:

requiring registration, enabling transmissions of acknowledgments of receipt of outbound messages, and receiving acknowledgments from the messaging system of inbound messages from the selective call transceiver when the selective call transceiver is within a two-way area; and attempting registration while enabling receipt of acknowledgments from the messaging system of inbound messages from the selective call transceiver without requiring the transmission of acknowledgments of receipt of outbound messages when the selective call transceiver is within a one-and-a-half way area.

5. The method of claim 4, wherein the method further comprises the steps of inhibiting the transmission of registration requests and inhibiting the transmission of acknowledgments of receipt of outbound messages, and not requiring acknowledgments from the messaging system of receipt of inbound messages from the selective call transceiver when the selective call transceiver is in a one-way zone.

6. The method of claim 5, wherein the method further comprises the step of notifying the user of the selective call transceiver that the two-way function of the selective call transceiver is disabled when the selective call transceiver is in a one-way zone.

7. The method of claim 5, wherein the method further comprises the step of disabling the transmission of inbound messages from the selective call transceiver when the selective call transceiver is in a one-way zone.

8. The method of claim 4, wherein the method further comprises the steps at a messaging system of:

maintaining a preferred one-way zone list and a one-and-a-half way zone list matching a list in the selective call transceiver;

seeking the presence of a selective call transceiver in a two-way zone;

continuing two-way communication if the selective call transceiver is found in the two-way zone;

sending one-way outbound messages to the selective call transceiver to a one-way zone if a user directed messages to the one-way zone; and sending one-way outbound messages to the selective call transceiver to the zone or zones designated in the preferred one-way zone list when the messaging system is unsuccessful in delivering a message in the two-way zone or when the controller fails to locate the selective call transceiver in a two-way zone.

9. The method of claim 8, wherein the method further comprises the step of generating a statistically derived preferred one-way zone list at the two-way selective call transceiver's location and updating the preferred one-way zone list at the controller when the selective call transceiver enters a two-way zone.

10. The method of claim 8, wherein a preferred zone list is updated with information received over-the-air after successful registration by the selective call transceiver.

11. A selective call transceiver that operates in multiple coverage zones within a messaging system having a two-way area, a one-way area, and a one-and-a-half way area, the selective call transceiver comprising:

a selective call receiver coupled to a decoder and a controller;

a selective call transmitter coupled to the controller and an encoder; and a memory coupled to the controller, wherein the controller is programmed in a two-way area to require the selective call transmitter to transmit registration requests and to require the selective call receiver to receive a registration grant from the messaging system before enabling the receipt of outbound messages and before enabling the transmission of inbound messages and further programmed to transmit registration requests while enabling outbound message reception and inhibiting the transmission of inbound messages when the selective call transceiver is within a one-and-a-half way area until registration is granted, wherein the inbound transmission of inbound messages would no longer be inhibited.

12. The selective call transceiver of claim 11, wherein the controller is further programmed to allow the selective call transceiver to operate in a one-and-a-half way area as if the selective call transceiver were in a two-way area after registration is granted to the selective call receiver.

13. The selective call transceiver of claim 11, wherein the controller is further programmed to inhibit the transmissions of registration requests by the selective call transmitter, and further programmed to have the selective call receiver receive outbound messages when the selective call transceiver is in a one-way zone.

14. The selective call transceiver of claim 13, wherein the controller further operates to notifying the user of the selective call transceiver that the two-way function of the selective call transceiver is disabled when the selective call transceiver is in a one-way zone.

15. The selective call transceiver of claim 13, wherein the controller further operates to disable the transmission of inbound messages from the selective call transceiver when the selective call transceiver is in a one-way zone.

16. A system controller for operation in a messaging system having selective call transceivers that can operate in a two-way area, a one-way area, or a one-and-a-half way area, the system controller comprising:

a memory; and a processor programmed to operate in either a two-way mode, a one-way mode, or a one-and-a-half way mode based upon whether a particular transceiver is correspondingly in the two-way area, the one-way area or the one-and-a-half way area, wherein in a two-way mode the processor requires the particular transceiver to be registered before either directing the transmission of outbound messages to, or receiving and acknowledging inbound messages from the particular transceiver and wherein in a one-and-a-half way mode, the processor is programmed to direct the transmissions of outbound messages to the particular transceiver while enabling registration attempts by the particular transceiver, but further programmed to ignore inbound transmissions from the particular transceiver when the particular transceiver is not registered.

17. The system controller of claim 16, wherein in a one-way mode, the processor is programmed to direct transmissions of outbound messages to the particular transceiver, but further programmed to ignore inbound transmissions from the particular transceiver that is not registered.

* * * * *